(12) United States Patent
Tsuda (10) Patent No.: US 8,749,666 B2
(45) Date of Patent: Jun. 10, 2014

(54) IMAGE CAPTURING APPARATUS, DATA GENERATING APPARATUS, AND NON-TRANSISTORY STORAGE MEDIUM GENERATING DATA OF MOVING IMAGE FILE INCLUDING RAW DATA

(75) Inventor: Yutaka Tsuda, Yokohama (JP)

(73) Assignee: Nikon Corporation, Tokyo (JP)

(*) Notice: Subject to any disclaimer, the term of this patent is extended or adjusted under 35 U.S.C. 154(b) by 174 days.

(21) Appl. No.: 12/766,501

(22) Filed: Apr. 23, 2010

(65) Prior Publication Data

US 2010/0283862 A1 Nov. 11, 2010

(30) Foreign Application Priority Data

May 11, 2009 (JP) ................................. 2009-114199

(51) Int. Cl.
*H04N 5/76* (2006.01)
*H04N 5/225* (2006.01)

(52) U.S. Cl.
USPC ..................................... 348/231.6; 348/220.1

(58) Field of Classification Search
USPC .......................... 348/220.1, 231.3, 231.6, 715
See application file for complete search history.

(56) References Cited

U.S. PATENT DOCUMENTS

| 7,742,080 | B2* | 6/2010 | Nakajima | 348/222.1 |
| 2007/0052819 | A1* | 3/2007 | Nakao et al. | 348/231.1 |
| 2007/0132878 | A1 | 6/2007 | Tanaka | |
| 2009/0060447 | A1 | 3/2009 | Nakao | |
| 2009/0153704 | A1* | 6/2009 | Taoka | 348/240.2 |
| 2010/0149375 | A1* | 6/2010 | Sugimura | 348/231.2 |
| 2011/0199513 | A1* | 8/2011 | Ogawa | 348/231.99 |

FOREIGN PATENT DOCUMENTS

| JP | A-2003-188950 | 7/2003 |
| JP | A-2006-166250 | 6/2006 |
| JP | A-2007-166193 | 6/2007 |
| JP | A-2007-174302 | 7/2007 |
| JP | A-2008-005344 | 1/2008 |
| JP | A-2009-055335 | 3/2009 |
| JP | A-2009-088878 | 4/2009 |

OTHER PUBLICATIONS

Japanese Office Action issued in Japanese Application No. 2009-114199 dated Sep. 6, 2011 (with trans).
Office Action issued in Japanese Application No. 2009-114199 dated Jan. 4, 2011 (with translation).
Japanese Office Action issued in Japanese Application No. 2009-114199 dated Apr. 5, 2011 (with translation).

* cited by examiner

*Primary Examiner* — John Villecco
(74) *Attorney, Agent, or Firm* — Oliff PLC (57) ABSTRACT

An image capturing apparatus is provided with an image capturing unit and a generating unit. The image capturing unit includes an imaging sensor and captures a subject image to generate RAW data. The generating unit generates a moving image file including moving image data made up of a plurality of sets of RAW data which is generated by the image capturing unit, and incidental information data corresponding to each of the sets of RAW data and including at least one of image capturing information regarding the RAW data and property information of the RAW data. Accordingly, it is possible to generate the moving image data which is easy to be handled in image processing or image quality adjustment.

4 Claims, 8 Drawing Sheets

PROVIDED THAT M ≤ N

FIG.4B

PROVIDED THAT K ≤ N    PROVIDED THAT L ≤ N

FIG.8

IMAGE CAPTURING APPARATUS, DATA GENERATING APPARATUS, AND NON-TRANSISTORY STORAGE MEDIUM GENERATING DATA OF MOVING IMAGE FILE INCLUDING RAW DATA

CROSS REFERENCE TO RELATED APPLICATION

This application is based upon and claims the benefit of priority from Japanese Patent Application No. 2009-114199, filed on May 11, 2009, the entire content of which is incorporated herein by reference.

BACKGROUND

1. Field

The present application relates to an image capturing apparatus, a data generating apparatus, and a data structure.

2. Description of the Related Art

Conventionally, when generating a still image, an image capturing apparatus such as an electronic camera generally records image data of a so-called RAW image before image processing in preparation for performing image processing, image quality adjustment or the like afterward. For example, the invention of Japanese Unexamined Patent Application Publication No. 2006-166250 allows the development of the RAW data after image capturing in a camera by recording the RAW data when generating the still image.

Meanwhile, various needs for a moving image are increasing recently along with the higher accuracy of an imaging sensor or a processing circuit. The above RAW data have many problems regarding processing speed or processing load in comparison with the still image, although the RAW data are useful also for the moving image.

SUMMARY

Accordingly, the present application has been achieved in view of the above problems and has an object of generating moving image data which is easy to be handled in the image processing or the image quality adjustment.

An image capturing apparatus according to an aspect of embodiment has an image capturing unit including an imaging sensor and capturing a subject image to generate RAW data, and a generating unit generating a moving image file including moving image data made up of a plurality of sets of RAW data which is generated by the image capturing unit, and incidental information data corresponding to each of the sets of RAW data and having at least one of image capturing information regarding the RAW data and property information of the RAW data.

A data generating apparatus according to an aspect of embodiment has an obtaining unit obtaining a plurality of sets of RAW data and incidental information data corresponding to each of the sets of RAW data and including at least one of image capturing information regarding the RAW data and property information of the RAW data, and a generating unit generating a moving image file including moving image data made up of the sets of RAW data which is obtained by the obtaining unit, the incidental information data obtained by the obtaining unit, and control information data controlling a whole moving image.

A data generating apparatus according to another aspect of embodiment has an obtaining unit obtaining a plurality of sets of RAW data and incidental information data corresponding to each of the sets of RAW data and including at least one of image capturing information regarding the RAW data and property information of the RAW data, and a generating unit generating a moving image file including moving image data made up of the sets of RAW data which is obtained by the obtaining unit and the incidental information data for each of a plurality of groups into which the sets of RAW data are grouped.

An image capturing apparatus according to another aspect of embodiment has an image capturing unit including an imaging sensor and capturing a subject image to generate RAW data and either one of the above described data generating apparatuses, in which the obtaining unit obtains the sets of RAW data from the image capturing unit and the generating unit generates the incidental information data based on a image capturing condition in the image capturing unit.

Note that the image capturing apparatus may further have an accepting unit accepting a user's designation regarding image processing for the moving image data, and an information adding unit generating new incidental information based on the user' designation and adding the new incidental information being generated to the incidental information data.

Further, the property information may include parameter information regarding image processing and the information adding unit may generate the parameter information which changes continuously between the sets of RAW data being continuous in time sequence, as new incidental information.

In addition, the image capturing information may include at least one of lens information, focus adjustment information, and focal distance information.

Further, the property information may include parameter information regarding image processing.

DETAILED DESCRIPTION OF THE EMBODIMENT

In the following, an embodiment will be explained by the use of the drawings. The present embodiment will explain an example of an electronic camera.

Figure 1:
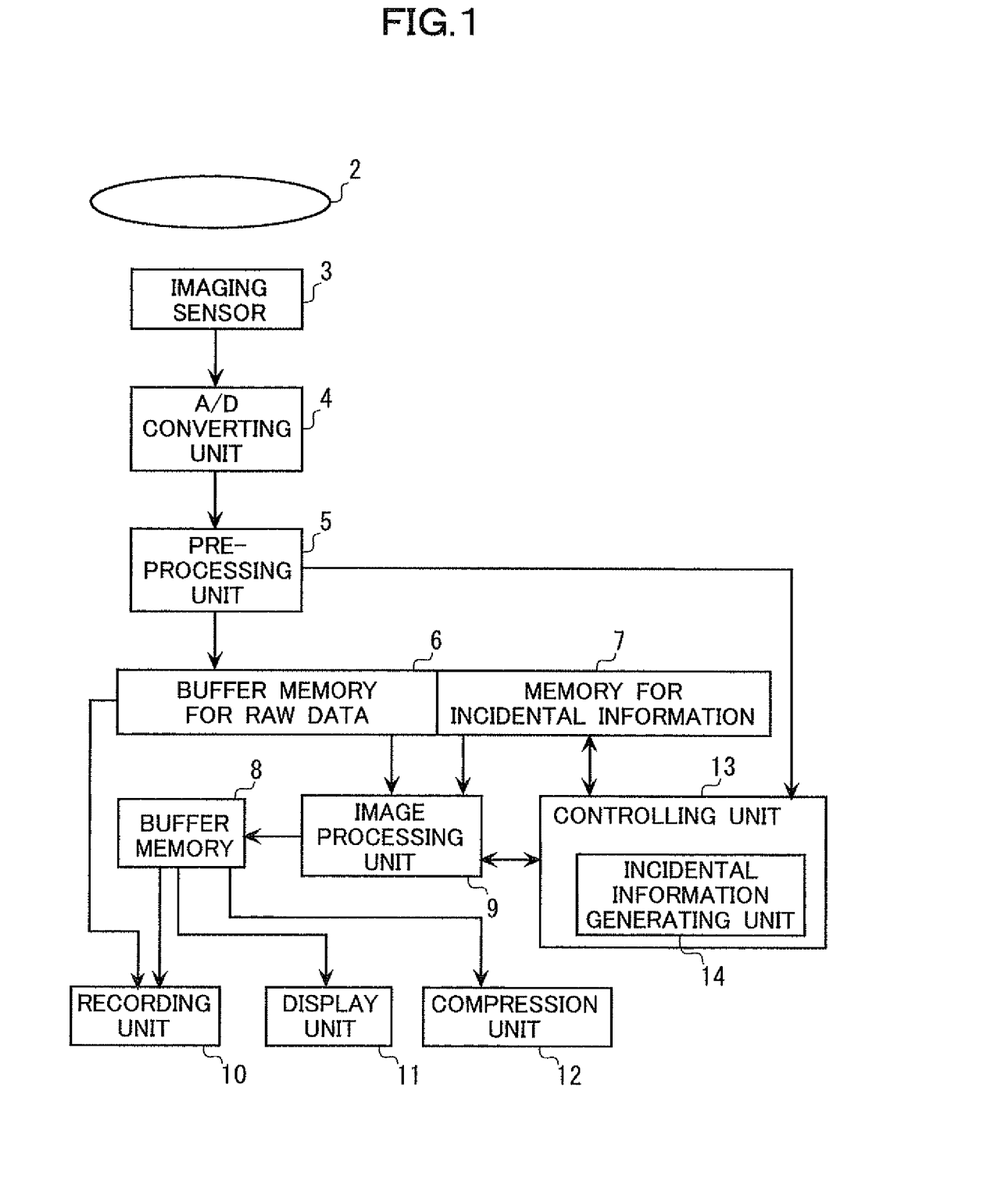
FIG. 1 is a block diagram showing an outline of an electronic camera of the present embodiment.

FIG. 1 is a block diagram showing an outline of an electronic camera of the present embodiment. The electronic camera 1 is provided with each of a photographic lens 2, an imaging sensor 3, an A/D converting unit 4, a pre-processing unit 5, a buffer memory for RAW data 6, memory for incidental information 7, a buffer memory 8, an image processing unit 9, a recording unit 10, a display unit 11, and a compression unit 12, as shown in FIG. 1. The photographic lens 2 is made up of plural lens groups including a zoom lens or the like, which are not shown in the drawing. Further, the imaging sensor 3 is provided with an image sensor such as a CCD or a CMOS and captures a subject image to output an analog signal. The A/D converting unit 4 obtains the analog signal from the imaging sensor 3 and outputs digital data. The pre-processing unit 5 calculates a white balance evaluation value and various sensor evaluation values and also provides the digital data obtained from the A/D converting unit 4 with basic image processing such as defective pixel correction. The buffer memory for RAW data 6, the memory for incidental information 7, and the buffer memory 8 are memories for developing image data or the like temporarily, and the details thereof will be described hereinafter. The image processing unit 9 performs image processing such as interpolation processing, white balance adjustment, color processing, gradation adjustment, noise rejection or the like. The recording unit 10 is provided with a card interface and a memory card which are not shown in the drawing, and records the image data and various kinds of information. The display unit 11 is provided with a display controlling unit and a display device which are not shown in the drawing, and displays an image, various menus, or the like. The compression unit 12 performs the JPEG compression for the image data of a still image, the MPEG compression for the image data of a moving image, or the like.

The electronic camera 1 is further provided with a controlling unit 13 controlling each of the units in addition to the above configuration. The controlling unit 13 is provided with an incidental information generating unit 14. The details of the incidental information unit 14 will be described hereinafter.

In the above explained electronic camera 1, when performing image capturing, the controlling unit 13 captures a subject image through the photographing lens 2 in the imaging sensor 3 and controls the A/D converting unit 4, the pre-processing unit 5, the buffer memory for RAW data 6, the image processing unit 9, the buffer memory 8, the compression unit 12 and the like as needed to generate image data, and then records the image data into the recording unit 10 and also displays the image data on the display unit 11. Note that the electronic camera 1 has a "still image capturing mode" by which a still image is generated and a "moving image capturing mode" by which a moving image is generated. Further, the electronic camera 1 has a "RAW mode" by which RAW data before the image processing by the image processing unit 9 is generated and a "normal mode" by which image data subjected to the image processing by the image processing unit 9 and the compression processing by the compression unit 12 is generated for each of the image capturing modes.

The still image capturing mode is the same as that in a publicly known technique. Further, also the normal mode of the moving image capturing mode is the same as that in a publicly known technique. In the following, the operation of the controlling unit 13 in the RAW mode of the moving image capturing mode will be explained with reference to a flowchart in FIG. 2.

Figure 2:
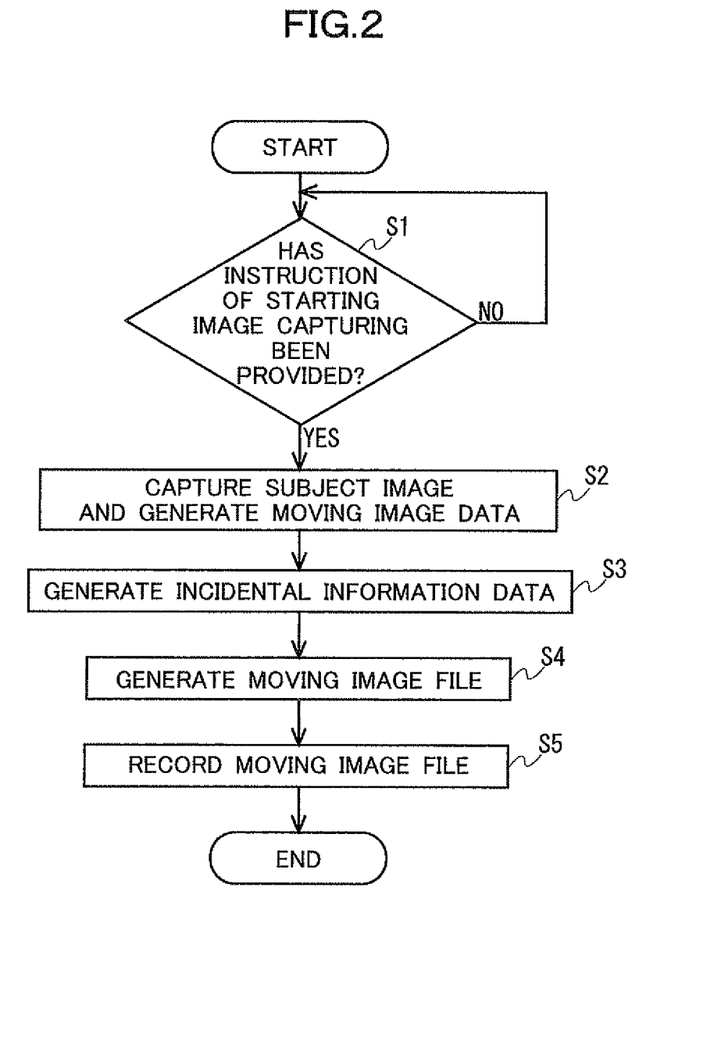
FIG. 2 is a flowchart showing an operation of a controlling unit 13 in a RAW mode of a moving image capturing mode.

In Step S1, the controlling unit 13 determines whether the instruction of starting image capturing has been provided or not. If the instruction of staring the image capturing is determined to have been provided by a user via an operation unit which is not shown in the drawing, the controlling unit 13 goes to Step S2.

In Step S2, the controlling unit 13 captures a subject image in the imaging sensor 3 and generates moving image data. Note that the time interval of the image capturing in the imaging sensor 3 is preliminarily determined (e.g., 30-60 frames/second). The controlling unit 13 repeats the image capturing with the imaging sensor 3 at this time interval until the instruction of terminating the image capturing is provided.

Figure 3A:
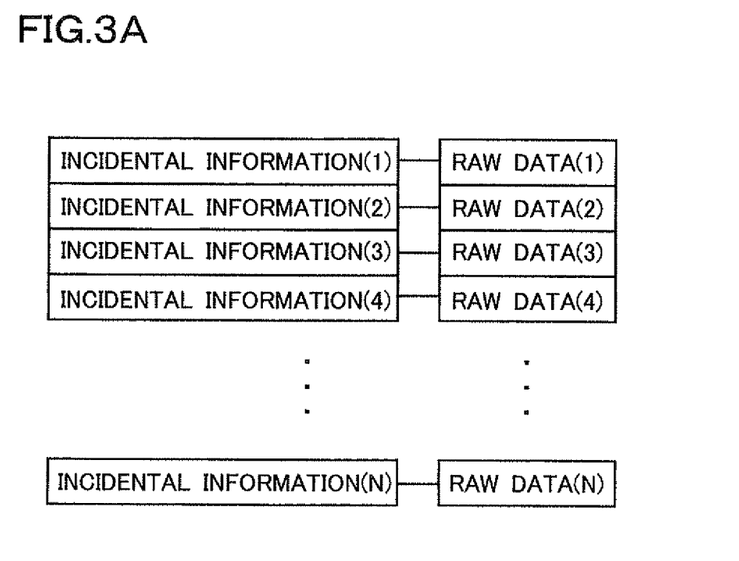
FIG. 3A is a diagram explaining incidental information.

In Step S3, the controlling unit 13 generates incidental information data in the incidental information generating unit 14. The incidental information is information to be attached to the RAW data in correspondence to each of the plural sets of RAW data included in the moving image. The incidental information includes image capturing information and property information. The image capturing information includes lens information, focus adjustment information, focal distance information, and the like, and the property information includes various kinds of parameter information, and the like, regarding image processing. The lens information includes magnification color aberration information, distortion aberration information, and the like. Further, the parameter information includes a white balance evaluation value, a brightness evaluation value (exposure evaluation value), a contrast evaluation value, an edge evaluation value, a noise evaluation value, a chroma evaluation value, and the like. The incidental information is generated as shown in FIG. 3A in correspondence to each of the plural sets of RAW data (RAW data (1)-(N) in FIG. 3A) which are generated by the image capturing started in Step S2 (Incidental information (1)-(N) in FIG. 3A).

Figure 3B:
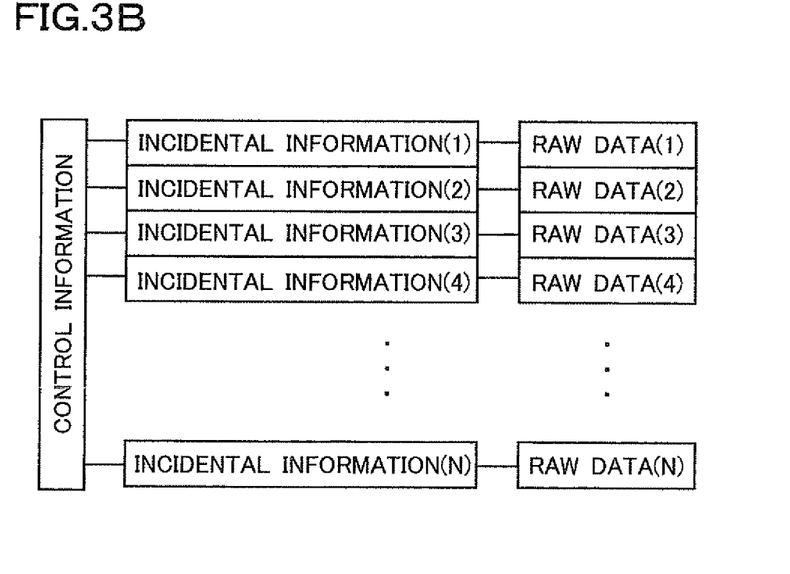
FIG. 3B is a diagram explaining a relationship between control information and incidental information.

Note that the controlling unit 13 may further generate control information controlling the whole moving image as the incidental information. The control information includes information regarding a capturing date and time of the moving image and the first and the last frame (frame number or the like). FIG. 3B shows a relationship between the control information and the above described incidental information (Incidental information (1)-(N) in FIG. 3A). The controlling unit 13 can reduce a total data amount by combining a common part among the above described incidental information sets (Incidental information (1)-(N) in FIG. 3A) to form the control information.

Further, for reducing the data amount of the incidental information, the controlling unit 13 may group the plural sets of RAW data generated by the image capturing started in Step S2 into plural groups and generate the incidental information for each of the groups.

Figure 4A:
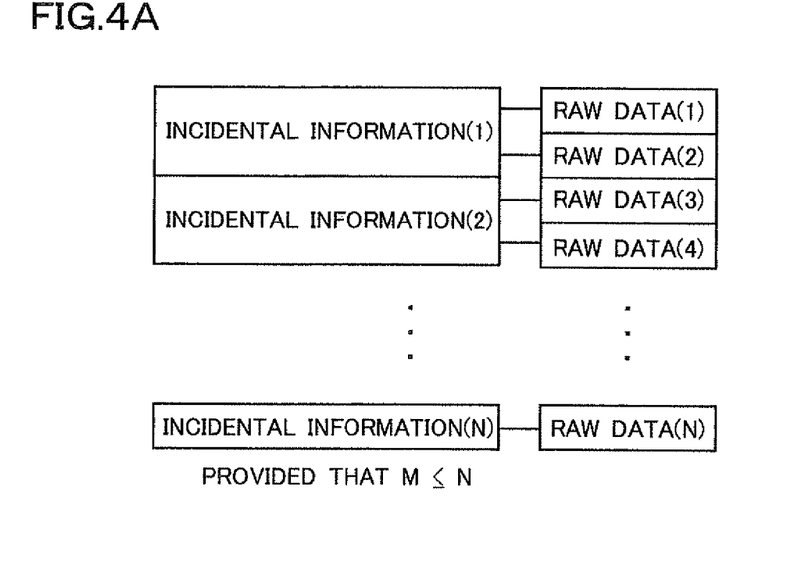
FIG. 4A is another diagram explaining incidental information.

For example, as illustrated in FIG. 4A, the controlling unit 13 groups RAW data (1) and RAW data (2) into one group and generates Incidental information (1) as the incidental information for this group. Similarly, the controlling unit 13 groups RAW data (3) and RAW data (4) into one group and generates Incidental information (2) as the incidental information for this group. In this manner, by generating the incidental information for each of the groups, it is possible to further reduce the total data amount. Note that it is preferable to perform the grouping according to an image capturing scene of the moving image. Accordingly, the controlling unit 13 may analyze, for example, the above described image capturing information or property information as needed and group the plural sets of RAW data having variations within a predetermined range into one group.

Figure 4B:
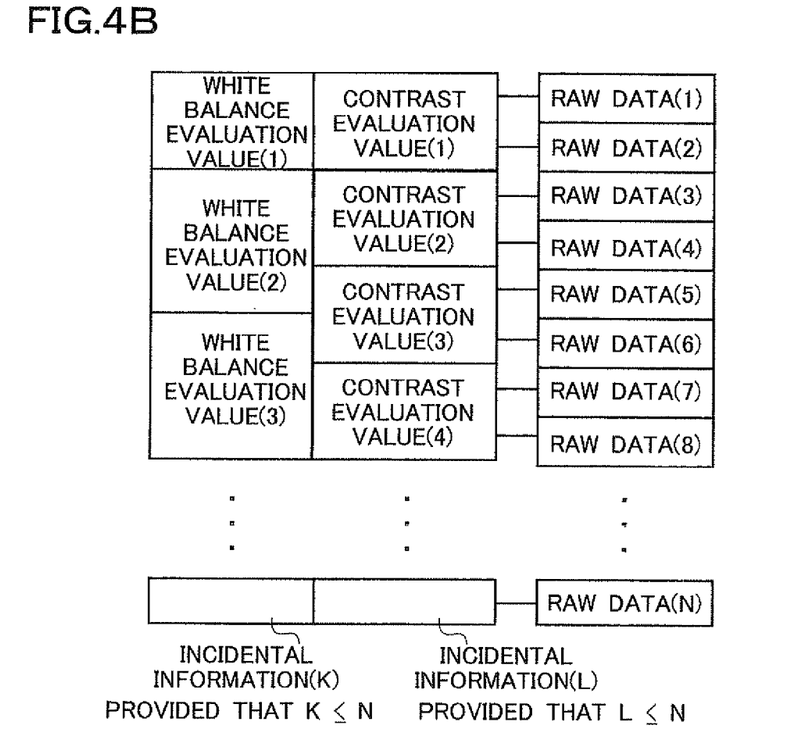
FIG. 4B is another diagram explaining incidental information.

Note that when it is difficult to arrange the grouping among plural factors included in the incidental information, the controlling unit 13 may carry out the grouping for each of the factors included in the incidental information. For example, as illustrated in FIG. 4B, the controlling unit 13 may carry out the grouping separately for the two factors (white balance evaluation value and contrast evaluation value in FIG. 4B). Further, the controlling unit 13 may carry out the grouping by providing a priority order as needed for the plural factors included in the incidental information.

In Step S4, the controlling unit 13 generates a moving image file. The controlling unit 13 generates a moving image file using the moving image data made up of the plural sets of RAW data which is generated by the image capturing started in Step S2 and incidental information data of the incidental information which is generated in Step S3.

In Step S5, the controlling unit 13 records the moving image file generated in Step S4 into the recording unit 10 and terminates the series of processes.

The incidental information in the moving image file generated in the sequence explained above can be adjusted according to a user operation. In the following, the operation of the controlling unit 13 for adjusting the incidental information in the moving image file will be explained with reference to a flowchart in FIG. 5.

Figure 5:
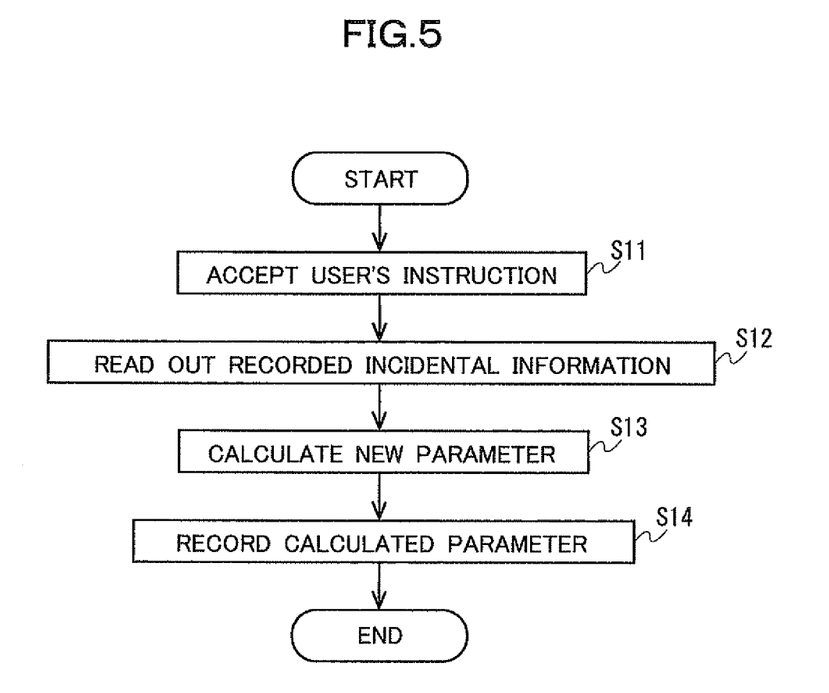
FIG. 5 is a flowchart showing an operation of a controlling unit 13 for the adjustment of incidental information in a moving image file.
Figure 6:
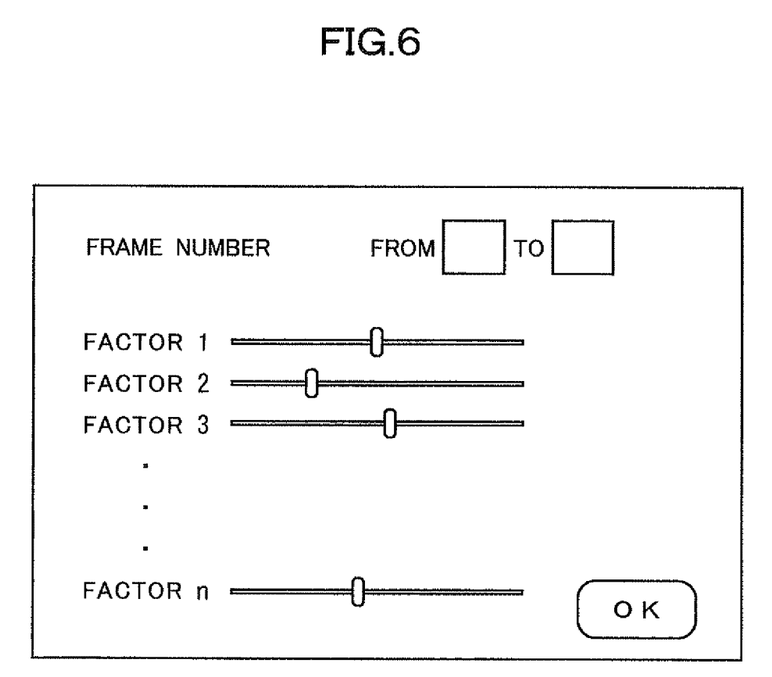
FIG. 6 is a diagram showing an example of a designation screen.

In Step S11, the controlling unit 13 accepts a user's instruction. The user carries out designation regarding the image processing for the moving image file recorded in the recording unit 10 via the operation unit which is not shown in the drawing. The controlling unit 13 displays a designation screen shown in FIG. 6 on the display unit 11, for example. The user designates a frame number in the moving image file, a kind of the factor to be adjusted, and adjustment contents while observing the display unit 11 visually. While FIG. 6 shows an example in which the user designates the frame number for designating a temporal range of the moving image file to be adjusted, there may be another configuration in which the user designates the range by time (time of day). Further, there may be another configuration in which the user designates the center of the temporal range of the moving image file to be adjusted and the adjustment is carried out in an appropriate range before and after the center. Moreover, when a factor regarding the whole moving image is desired to be changed in the same manner, it is optional to allow the whole moving image to be designated collectively.

Note that, in the example of FIG. 6, a slider bar is displayed for each factor of the image capturing information or the property information included in the incidental information, and the user can designate the kind of the factor to be adjusted and the adjustment contents by moving this slider bar.

In Step S12, the controlling unit 13 reads out the recorded incidental information. The controlling unit 13 reads out the incidental information to be adjusted from the recording unit 10 according to the user' designation accepted in Step S11.

In Step S13, the controlling unit 13 calculates a new parameter in the incidental information generating unit 14 according to the user's designation accepted in Step S11. The new parameters are various parameters regarding the image processing and the incidental information generating unit 14 calculates the new parameter satisfying the user's designation accepted in Step S11 by using the incidental information read out in Step S12. When plural frames (RAW data) are designated in Step S11, the parameters corresponding to these frames are calculated collectively.

Note that, when the parameter changes abruptly, there is a problem that the image processing performed by using this parameter causes an unnatural moving image and thereby causes user's uncomfortable feeling. Such a problem frequently occurs when the image capturing scene changes abruptly before or after the above-described frame designated by the user. Accordingly, the incidental information generating unit 14 may calculate the parameter so as to cause the parameter to change continuously and smoothly between the continuous plural frames.

Figure 7A:
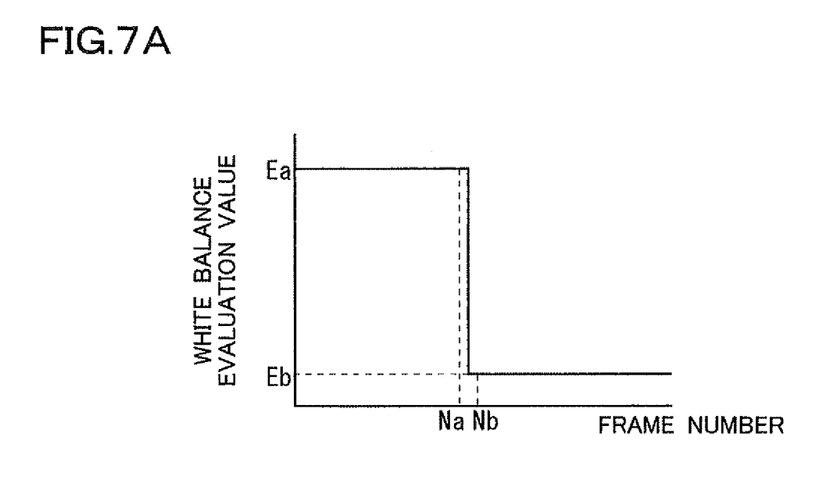
FIG. 7A is a diagram explaining parameter calculation.
Figure 7B:
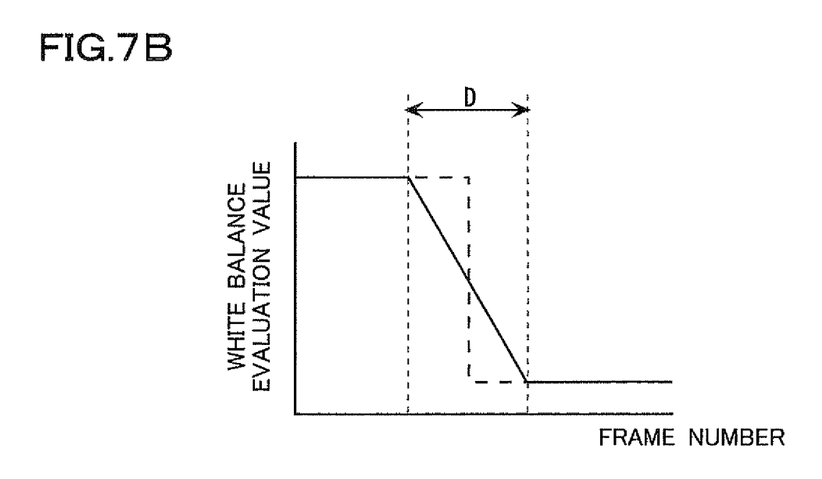
FIG. 7B is another diagram explaining parameter calculation.

For example, an example will be explained for a case where the white balance evaluation value of the image changes abruptly in the moving image to be adjusted. The horizontal axis of FIG. 7 shows the frame number of the RAW data and the vertical axis shows the white balance evaluation value. When the white balance evaluation value changes abruptly from Ea to Eb between the frame number: Na and the frame number: Nb as illustrated in FIG. 7A, the incidental information generating unit 14 interpolates the white balance evaluation value in an appropriate range D centering this boundary so as to cause the parameter to change continuously and smoothly between the continuous plural frames as illustrated in FIG. 7B. The range D may be preliminarily determined or may be a range which can be designated by the user.

In Step S14, the controlling unit 13 records the calculated parameter into the recording unit 10 and terminates the series of processes. The controlling unit 13 records the parameter calculated in Step S13 into the incidental information data in the moving image file at an appropriate location. Note that the controlling unit 13 may additionally record the parameter calculated in Step 13 or may record the parameter by overwriting the existing parameter before the adjustment.

Figure 8:
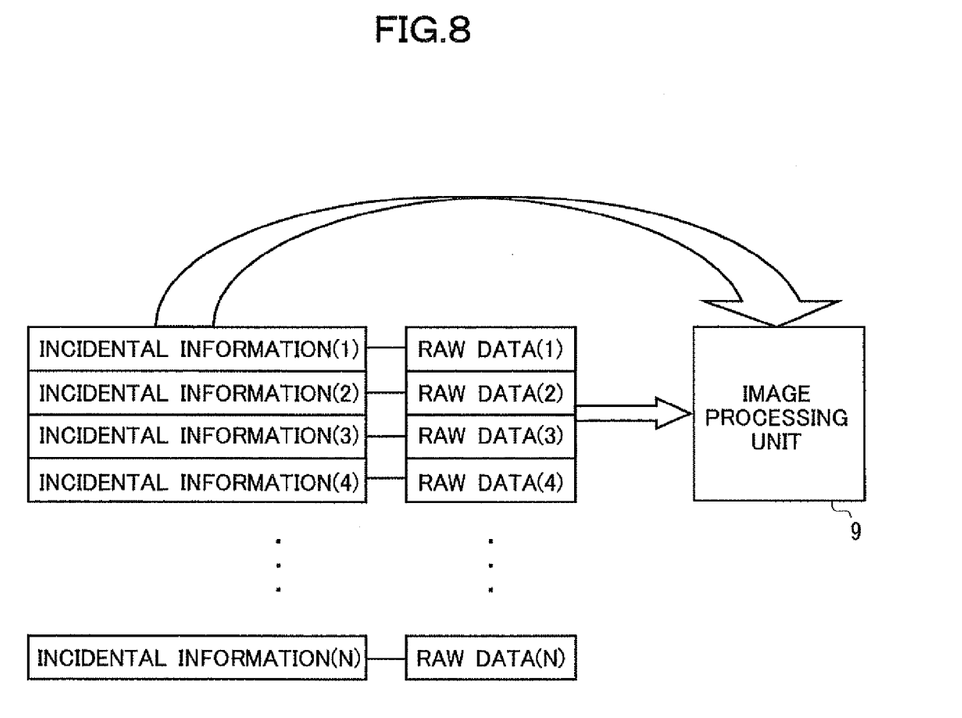
FIG. 8 is another diagram explaining incidental information.

It is possible to perform the image processing of the moving image file which is generated (flowchart in FIG. 2) and adjusted (flowchart in FIG. 5) in the above explained respective methods according to a user's operation. When performing various kinds of image processing of the moving image data included in the moving image file, the controlling unit 13 performs the image processing of each of the RAW data sets according to the incidental information data corresponding to the RAW data. That is, the image processing unit 9 performs the image processing of the RAW data (1) according to Incidental information (1) and performs the image processing of RAW data (N) according to Incidental information (N) as shown in an exemplary diagram of FIG. 8. Then, when the image processing of all the RAW data sets has been completed, the compression unit 12 arbitrarily performs the compression processing. Note that the compression processing by the compression unit 12 is performed as needed and any compression format may be used.

As explained above, the present embodiment generates the incidental information including at least one of the image capturing information regarding the RAW data and the property information of the RAW data so as to correspond to each of the plural RAW data sets included in the moving image, and generates the moving image file including the moving image data and the incidental information data. Accordingly, it is possible to generate moving image data easy to be handled in image processing or image quality adjustment. Further, the present embodiment accepts the user's designation regarding the image processing of the moving image data, generates new incidental information according to the accepted user's designation, and adds the generated new incidental information to the incidental information data. Accordingly, it is possible to adjust only the incidental information and thereby it is possible to make the processing simple compared to a conventional case where confirmation and processing designation is performed for each of the moving image RAW data sets. For example, with the change, and the like of a field angle even when the close up of a person occurs, it is possible to perform preferable image processing by generating new incidental information regarding white balance or contrast for the portion. Further, regarding optical system correction, it is possible to obtain a similar effect when performing out processing such as magnification color aberration correction or distortion aberration correction.

Note that, while the present embodiment explains an example of a case including the "RAW mode" by which the RAW data before the image processing is generated and the "normal mode" by which the image data subjected to the compression processing for the image capturing modes is generated, the present invention is not limited to this example.

For example, there may be a configuration which generates both of the RAW data before the image processing and the image data subjected to the compression processing and records the two sets of data in association with each other. In this case, there may be a configuration to use the image data provided with the compression processing for display on the display unit 11 and to use the RAW data for the actual image processing at the time of the confirmation of the moving image or the adjustment of the incidental information as explained in FIG. 5.

Further, the incidental information explained in the present embodiment is an example and other information may be utilized as the incidental information. For example, when the electronic camera is provided with an altitude sensor, the output of the sensor can be utilized as the incidental information.

Moreover, the present embodiment explains an example of realizing the technique of the present invention in the electronic camera 1. However, the present invention is not limited to this example. For example, it is possible to obtain data corresponding to the moving image data and the incidental information data explained in the present embodiment, from the outside and to apply the present invention similarly to a data generating apparatus which generates the moving image file explained in the present embodiment.

In addition, it is optional to realize the processing explained in the present embodiment in a software manner by the use of a computer and an image processing program. In this case, the moving image data is obtained from the outside instead of the processing in Step S2 explained in the flowchart of FIG. 2 and the incidental information data is obtained from the outside instead of the processing in Step S3. Then, a part of or the whole processing in Step S4 and Step S5 may be configured to be realized by the computer. Further, a part of or the whole of the processing in Step S11 to Step S14 explained in the flowchart of FIG. 5 may be configured to be realized by the computer. By such a configuration, it becomes possible to perform the same processing as the present embodiment.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. An image capturing apparatus comprising:
an image capturing unit including an imaging sensor and capturing a subject image to generate RAW data;
a generating unit generating a moving image file including (1) moving image data made up of a plurality of sets of RAW data which is generated by the image capturing unit, and (2) incidental information data corresponding to each of the sets of RAW data and including at least property information which includes parameter information regarding image processing for the RAW data;
an information adding unit (1) generating, as new incidental information, the parameter information that changes continuously, the parameter information being interpolated between the sets of RAW data, the sets of RAW data being continuous in time sequence, existing within a predetermined range that includes both a set of RAW data before. and a set of RAW data after, a boundary of change of the parameter information regarding the image processing included in the property information, the boundary of change being made of two of the RAW data, and (2) adding the generated new incidental information to the incidental information data, the moving image file including control information data controlling a whole moving image and the incidental information data for each of a plurality of groups into which the sets of RAW data are grouped, the control information data including a capturing date and time of the moving image file and a first and last frame; and
an accepting unit accepting a user's designation regarding image processing for the RAW data being desired among the moving image data and a user's designation regarding a designation of the desired RAW data;
wherein the information adding unit (1) generates the new incidental information based on the desired RAW data designated by the user's designation via the accepting unit among the moving image file, and (2) adds the new incidental information being generated to the incidental information data.

2. The image capturing apparatus according to claim 1, wherein
the generating unit generates the incidental information data including, in addition to the property information. image capturing information which includes at least one of lens information, focus adjustment information, and focal distance information.

3. A data generating apparatus comprising:
an obtaining unit obtaining a plurality of sets of RAW data and incidental information data corresponding to each of the sets of RAW data and including at least one of image capturing information regarding the RAW data and property information of the RAW data;
a generating unit generating a moving image file including moving image data made up of the sets of RAW data which is obtained by the obtaining unit, the incidental information data obtained by the obtaining unit, and control information data controlling a whole moving image;
an information adding unit (1) generating, as new incidental information, the parameter information that changes continuously, the parameter information being interpolated between the sets of RAW data, the sets of RAW data being continuous in time sequence, existing within a predetermined range that includes both a set of RAW data before, and a set of RAW data after, a boundary of change of the parameter information regarding the image processing included in the property information, the boundary of change being made of two of the RAW data, and (2) adding the generated new incidental information to the incidental information data, the moving image file including control information data controlling a whole moving image and the incidental information data for each of a plurality of groups into which the sets of RAW data are grouped, the control information data including a capturing date and time of the moving image file and a first and last frame; and
an accepting unit accepting a user's designation regarding image processing for the RAW data being desired among the moving image data and a user's designation regarding a designation of the desired RAW data;

wherein the information adding unit (1) generates the new incidental information based on the desired RAW data designated by the user's designation via the accepting unit among the moving image file, and (2) adds the new incidental information being generated to the incidental information data.

4. A non-transitory computer-readable storage medium storing a program, which causes a computer to perform the steps comprising:

generating a moving image file including (1) moving image data made up of a plurality of sets of RAW data which is generated by the image capturing unit, and (2) incidental information data corresponding to each of the sets of RAW data and including at least property information which includes parameter information regarding image processing for the RAW data;

generating, as new incidental information, the parameter information that changes continuously, the parameter information being interpolated between the sets of RAW data, the sets of RAW data being continuous in time sequence, existing within a predetermined range that includes both a set of RAW data before, and a set of RAW data after, a boundary of change of the parameter information regarding the image processing included in the property information, the boundary of change being made of two of the RAW data, and adding the generated new incidental information to the incidental information data, the moving image file including control information data controlling a whole moving image and the incidental information data for each of a plurality of groups into which the sets of RAW data are grouped, the control information data including a capturing date and time of the moving image file and a first and last frame; and accepting a user's designation regarding image processing for the RAW data being desired among the moving image data and a user's designation regarding a designation of the desired RAW data;

wherein the information adding unit (1) generates the new incidental information based on the desired RAW data designated by the user's designation via the accepting unit among the moving image file, and (2) adds the new incidental information being generated to the incidental information data.

* * * * *